United States Patent [19]

Craigen et al.

[11] Patent Number: 4,719,806
[45] Date of Patent: Jan. 19, 1988

[54] FLUID FLOW RATE MONITOR PROBE

[75] Inventors: Joseph G. Craigen, Whitley Bay; Bryan F. Dixon, Newcastle-upon Tyne, both of England

[73] Assignee: British Gas Corporation, London, England

[21] Appl. No.: 831,501

[22] Filed: Feb. 21, 1986

[30] Foreign Application Priority Data

Feb. 27, 1985 [GB] United Kingdom ............. 8505092

[51] Int. Cl.$^4$ ................................................ G01F 1/20
[52] U.S. Cl. ................................ 73/861.42; 73/861.52
[58] Field of Search ............... 73/182, 202, 861.52, 73/861.61, 861.62, 861.63, 861.64, 861.65, 861.42

[56] References Cited

U.S. PATENT DOCUMENTS

| | | | |
|---|---|---|---|
| 790,888 | 5/1905 | Ferris | 73/861.64 X |
| 1,089,129 | 3/1914 | Havill | 73/861.63 |
| 1,980,672 | 11/1934 | Engel | 73/861.61 |
| 2,127,501 | 8/1938 | Dall | 73/861.61 |
| 2,704,555 | 3/1955 | Dall | 73/861.63 X |
| 2,842,962 | 7/1958 | Dall | 73/861.61 |
| 3,559,482 | 2/1971 | Baker et al. | 73/202 |
| 3,683,693 | 8/1972 | Brown | 73/861.65 |
| 3,719,082 | 3/1973 | Obermaier | 73/202 |
| 3,759,098 | 9/1973 | Logsdon et al. | 73/861.52 |
| 4,047,521 | 9/1977 | Kramer et al. | 73/861.52 X |

FOREIGN PATENT DOCUMENTS

| | | |
|---|---|---|
| 345839 | 4/1931 | United Kingdom . |
| 1327015 | 8/1973 | United Kingdom . |
| 2012056 | 7/1979 | United Kingdom . |

OTHER PUBLICATIONS

Withdrawable Pitot Devices for Pipelines by H. E. Dall, Oct. 1962, pp. 134-139.
Marks' Standard Handbook for Mechanical Engineers, by Theodore Baumeister et al., 8th Edition.

Primary Examiner—Herbert Goldstein
Attorney, Agent, or Firm—Oblon, Fisher, Spivak, McClelland & Maier

[57] ABSTRACT

The probe is of the withdrawable type and consists of an elongated cylindrical body made up of a tube 10 joined to an upper T-connector and to a lower tip portion 18. The tip portion 18 is of stepped shape and has a through-passage 34 beneath the step. A pressure tapping 36 opens at a port 38 in the wall of the through-passage 34 to sense reduced pressure at a vena contracta in the passage 34. Another tapping 40 opens at a port 42 in the step face 26 adjacent a concave face 28 which causes a pressure higher than static pressure. The total pressure difference can be three velocity heads and is communicated through tubes 20, 22 to a differential valve so that changes in flow rate in the pipe 16 affect the valve. The probe is relatively of small diameter and is especially applicable to control of the pressure in relation to the rate of flow of natural gas in distribution systems.

6 Claims, 5 Drawing Figures

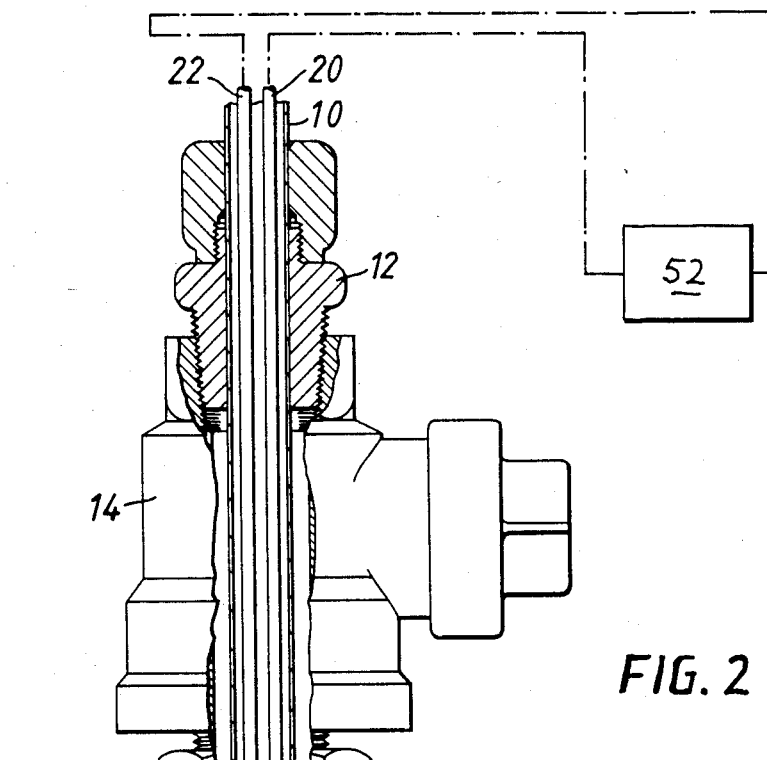
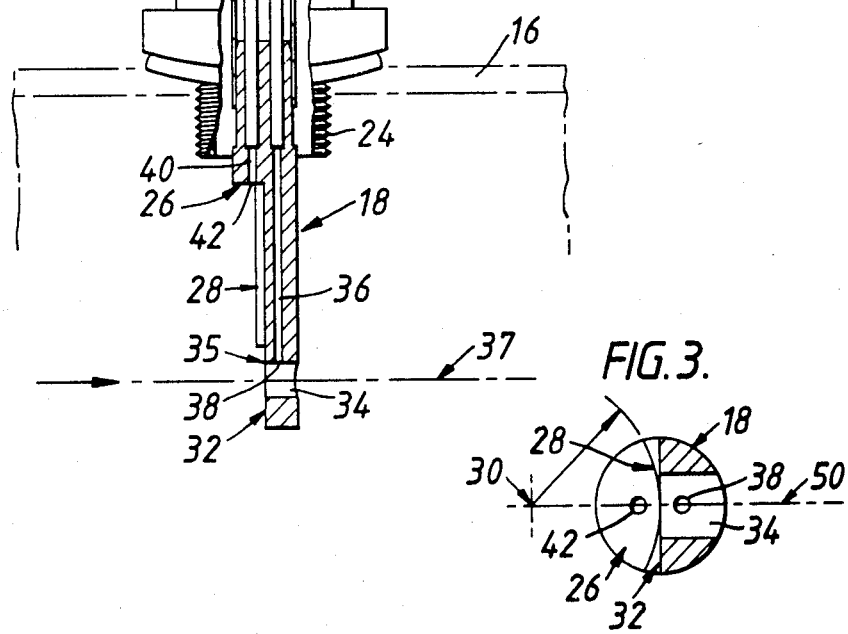
FIG. 2
FIG. 3.

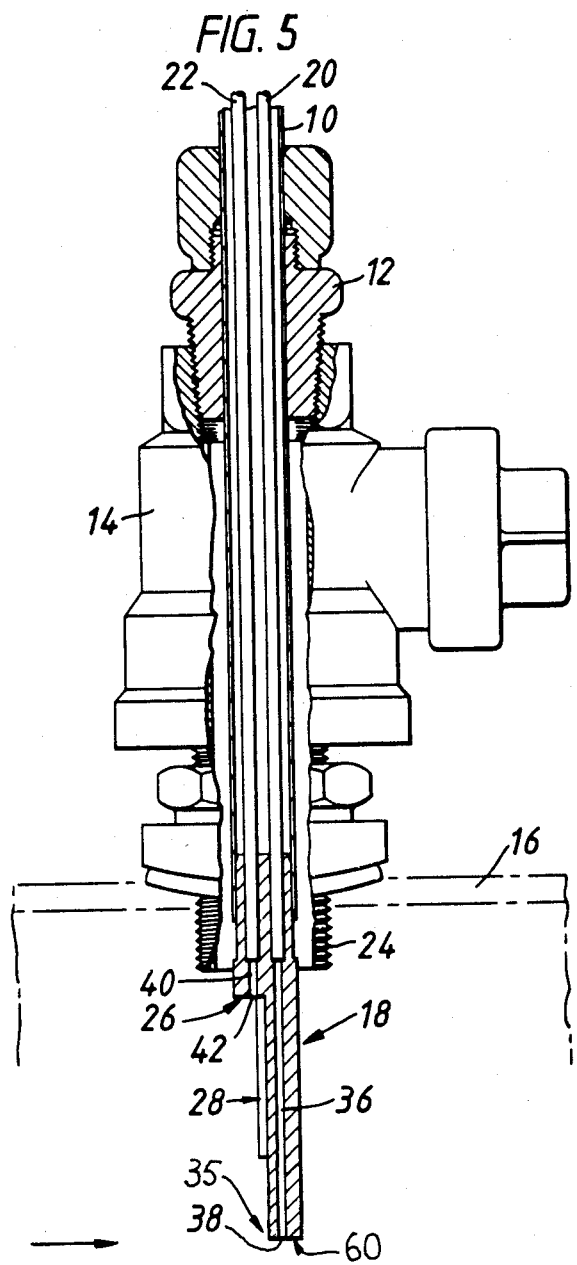

FLUID FLOW RATE MONITOR PROBE

BACKGROUND OF THE INVENTION

1. Field of the Invention

The invention relates to probes for use in monitoring flow rate in fluids. The invention particularly, though not exclusively, relates to such probes used for monitoring the flow rate of natural gas in distribution pipes.

2. Background of the Related Art

A well-known kind of probe is the so-called Pitot-static tube. Such a tube is L-shaped and has a lower end portion extending parallel to the direction of the monitored flow. The tip of the end portion is presented towards the oncoming flow and has a first sensing port the plane of which is transverse to the monitored flow. A second sensing port, or each one of an array of second ports, is provided downstream of the first port in the wall of the end portion. The plane of the, or of each, second port is parallel to that monitored flow. The difference between the pressures at the first and second ports is proportional to the square of the velocity of the fluid at the tip.

The L-shape of such a probe precludes its general use because, for practical purposes, it is required that the probe be straight so that it can be inserted on withdrawn through a gland or valve in the wall of the pipe confining the monitored flow. A probe of straight construction has been proposed in the UK patent specification No. 2012056A (Dieterich Standard Corporation). In that proposal, an elongate body has longitudinally extending edges at its lateral surfaces. At each edge a boundary layer separates from the body. A sensing port, facing downstream, is positioned at the downstream side of the body in the wake of the two streams of fluid flowing around the body past the two edges. Thus, the port is located somewhat remotely from the two edges. The edges are required to be accurately and symmetrically formed on the body.

SUMMARY OF THE INVENTION

The object of the invention is to provide a probe having a sensing port but which avoids the need for two such edges.

Apparatus for monitoring the flow rate of fluid flowing in a conduit according to the invention comprises first means producing a static fluid pressure differential and second means responsive thereto, said first means defining first and second sensing ports opening into said conduit and comprising means connecting said ports to said second means, said first means further comprising an elongate probe withdrawably mounted in said conduit in penetrating relationship thereto, said probe defining within said conduit a sharp edge and downstream thereof a wall at which said first sensing port opens close to said edge, said edge being effective to cause flow-separation of fluid from said wall to produce at said first port a first fluid pressure less than the general static pressure of the fluid in said conduit, said second port sensing a second fluid pressure at least equal to said general static pressure, said differential pressure being the difference between said second and first pressures and being dependent on said flow rate.

BRIEF DESCRIPTION OF THE DRAWINGS

An embodiment of the invention will now be described, by way of example, with reference to the accompanying drawings, in which:

FIG. 2 is a vertical section on the line II—II in FIG. 1;

FIG. 3 is an enlarged horizontal section on the line III—III in FIG. 1; and

FIGS. 4 and 5 correspond to FIGS. 1 and 2, respectively, but show a modified probe.

DETAILED DESCRIPTION OF THE PREFERRED EMBODIMENTS

Figure 1:
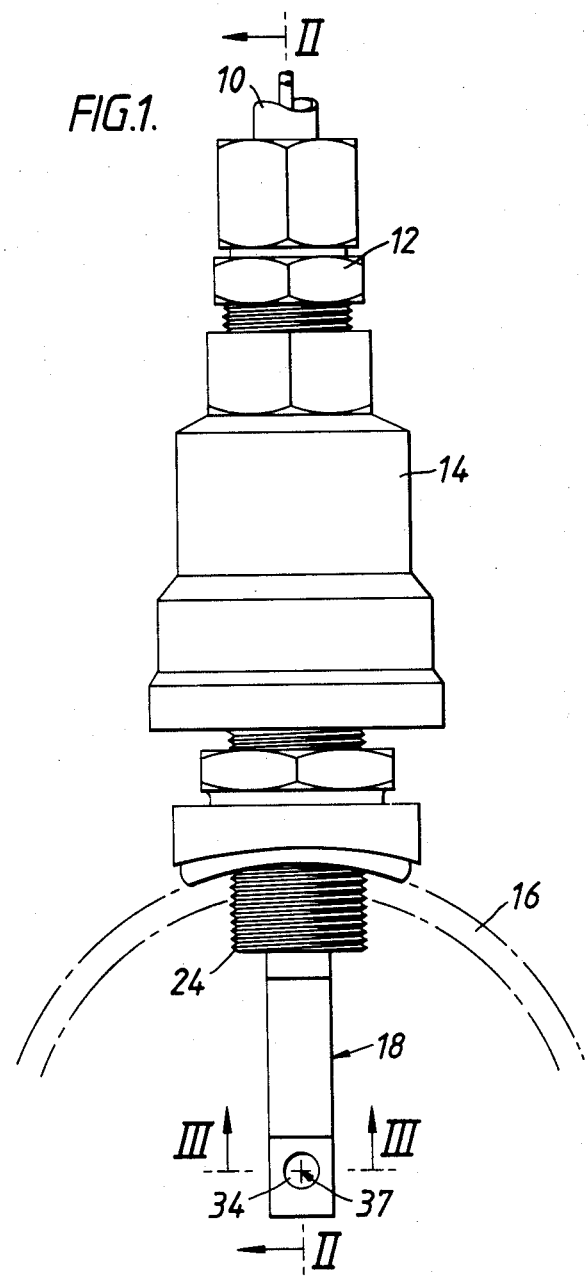
FIG. 1 is a part elevation of the probe in its operating position inserted through the wall of a gas pipe as seen in the direction of monitored flow through the pipe.

The probe comprises an elongate, cylindrical body made up of a stainless steel tube 10 joined by brazing at its upper end to a brass T-shaped connector body (not shown) and joined at its lower end to a tip portion 18 described below. The tube 10 extends through a coupling 12 and ball valve 14. The valve 14 is fitted at its lower end into a circular hole in the wall of a distribution pipe 16 through which natural gas flows. The lower end of the tube 10 is joined by brazing to the brass tip portion 18.

Two stainless steel tubes 20, 22 extend through the tube 10 and their lower ends are received in bores in the upper end of the portion 18 and are joined to the portion by brazing. The upper ends of the tubes 20, 22 are received in bores in the T-connection body (not shown) and are joined by brazing to the body.

The tip portion 18 is machined from solid rod, typically in this example of 0.5 inch (12.7 millimetre) outside diameter. Beneath the lower end of the tube 10 and beneath the lower end of the spigot 24 of the valve 14, the portion 18 is machined at the upstream side with respect to the direction of gas flow in the pipe 16 indicated by the arrow to form stepped shape defined by a downwardly presented horizontal face 26, extending parallel to the flow direction.

Beneath the face 26 the machining of the portion 18 leaves a concave face 28 further defining the stepped shape. As shown in FIG. 3 the centre of curvature of the face 28 is at 30, the face 28 thus being part of the inner surface of a notional hollow right cylinder having a vertical central axis of symmetry at 30 and having a radius of 12 mm, for example.

The machining leaves a plane vertical face at 32 beneath the lower end of the face 28. The face 32 extends downwardly to the lower extremity of the portion 18. A circular horizontal hole is drilled through the portion 18 to form a through-passage 34 with a sharp leading circular edge 35 defining an entrance at the face 32 and a sharp-edged exit at the cylindrical downstream surface of the portion 18. It is preferred, as shown, for the central axis of the passage 34 to coincide with the central axis 37 of the pipe 16. The passage 34 thus extends parallel to the direction of monitored flow in the pipe 16. Typically in this example, the diameter of the passage 34 is 6 mm.

Vertical pressure tappings are drilled through the portion 18. The first tapping 36 opens at its upper end into the tube 20 and at its lower end opens at a pressure sensing port 38 in the upper part of the wall of the through-passage 34. The sharp leading edge 35 of the passage 34 causes flow-separation of the gas away from the wall of the passage 34 and a vena contracta is formed within the passage 34. The port 38 is positioned so as to be at the flow-separation around the vena contracta.

The port 38 is preferably positioned as shown in FIG. 3 slightly nearer to the face 32 than to the convex downstream side of the portion 18 so that the pressure sensed at the port 38 is as low as possible. The optimum positioning of the port 38 and the optimum size of the through-passage 34 cannot be precisely stipulated but can be readily checked experimentally.

The second tapping 40 opens at its upper end into the tube 22 and at its lower end at a sensing port 42 in the face 26. The port 42 is closely adjacent the upper end of the concave face 28.

The T-connection (not shown) is connected by couplings to small diameter tubing leading to a differential pilot valve, for example a pilot valve of high gain type forming part of a system by which pressure in the pipe 16 can be related to the flow through the pipe. The probe in such a case is located downstream of a governor valve the setting of which is controlled by operation of the high gain pilot valve. The probe can be connected in other systems (not shown) to a different component, such as a manometer gauge or other device. In FIG. 2 the differential pilot valve, gauge or other device responsive to static differential pressure is indicated at 52.

Operation

The pressure at the port 38 is less than the static pressure of the gas in the pipe 16. It has been found in the case of the example of construction described above that the pressure at the port 38 is less than the static pressure by an amount equal to twice the dynamic pressure, owing to the effect of the flow-separation of the gas away from the wall of the passage 34 around the vena contracta.

The concave face 28 is effective to produce a stagnation zone immediately upstream of the face 28 and at the port 42 in which zone the pressure is higher than the static pressure by an amount equal to the dynamic pressure. Thus, the difference between the pressures at the two ports 38, 42 is equal to three times the dynamic pressure, alternatively referred to as the velocity head. Changes in the mean rate of flow of gas through the pipe 16 are readily monitored since the pressure sensed at the port 38 or 42 is dependent on the square of the velocity of the gas which approaches the port 38 or which passes the port 42, respectively. The convex form of the downstream side of the portion 18 facilitates flow to maintain high velocity past the probe and through the hole 34.

The probe described above with reference to the drawings has the following advantages:
(a) both of the ports 38, 42 are parallel to the direction of the monitored flow in the pipe 16 so that the risk of clogging of the ports by particulate matter, such as dust, in the gas flow is eliminated or greatly minimised;
(b) the pressure difference is greater, for comparable conditions, than the difference available at the ports of a Pitot-static tube or available from elbow tappings;
(c) the diameter of the probe is relatively smaller than the diameter of modified Pitot-type probes of withdrawable type incorporating Venturis and the probe diameter is not required to be increased as the diameter of the pipe 16 confining the monitored flow increases. Only a relatively small ball-valve or other fitting is required to mount the probe in the pipe wall and the probe construction is relatively simple. In particular, only pressure tappings extending longitudinally of the probe are required;
(d) the probe gives sufficient pressure difference to enable it to be substituted for an orifice plate in control systems. This achieves major gains with regard to greatly simplified installation and elimination of the major part of the pressure loss and flow disturbances caused by the orifice plate. The probe is effective over a useful range of rates of monitored flow;
(e) the probe can be installed in or withdrawn from a pipe while the pipe is conveying the gas flow at full pressure by means of a suitable valve assembly 12, 14, which greatly enhances the range of applicability and effectiveness of the probe.

In a modified form of probe (not shown) the face 28 is plane instead of concave. Some reduction of the pressure differences available from the probe will probably result. The curved face is preferred also because the pressure difference is unaffected by slight errors in angular orientation of the probe about its central longitudinal axis, which may arise during fitting to the pipe 16.

In another modified form of probe (not shown) the port 42, the tapping 40 and the tube 22 are dispensed with or not used. Instead, the static pressure of the gas flow is sensed by a port provided by a tapping in the wall of the pipe 16, eg upstream of the probe. In that case the pressure difference available between the tapping port and the port 38 would be reduced to a value equal to some two times the dynamic pressure. However, the other advantages of the probe would remain unaffected.

The size of the hole 34 was found by experiment in order to give satisfactory results. The same size of probe is applicable to pipes up to at least 12 inches (300 mm) inside diameter. In modifications, the size of the hole may be different from that specified above, subject to the requirement that a flow-separation occurs, in use, giving a pressure low enough to be useful.

In further modifications (not shown) one of the tubes 20, 22 is dispensed with, the respective sensing port communicating with the T-connection via the interior of the tube 10.

In a further modification (not shown) the tip portion 18 is stepped as described above but the face 28 extends right to the extremity of the tip portion 18 or nearly to the extremity and the step shape is positioned between the extremity and the through-passage, which typically, for example, is a circular hole similar to the hole 34 but extending through the full diameter of the portion 18. In such a case the face 28 conveniently has an axis of curvature offset from the central plane 50 shown in FIG. 3 so that the tapping and the port (corresponding to the port 42) are also offset so that the tapping avoids the through-passage.

In another modification (not shown) the through-passage has a pressure-recovery section at its downstream end. Such a modification enhances the velocity of flow through the passage by reducing the effective resistance presented by the passage. This can increase the total pressure differential available from the probe up to some six times the dynamic pressure. For example, the through-passage in such a case is a circular hole having a section at its downstream end which is conically divergent in the direction of fluid flow.

In other modifications (not shown) the through-passage is formed at the extremity of the tip portion 18, for example by machining a channel in the end wall of the tip portion, extending lengthwise in the direction of the monitored flow. Typically, the end wall is a plane wall normal to the length of the body and the transverse cross-section of the channel is semi-circular, or V-shaped or U-shaped with a flat or curved base. The leading edge of the channel (with respect to the flow direction) is such as to cause flow-separation of the gas away from the wall or walls of the channel, ie the leading edge is sufficiently sharp, for example, to produce the necessary flow-separation. A partial vena contracta is formed in the channel. The sensing port corresponding to the port 38 is positioned at or adjacent the position of maximum pressure depression caused by the flow-separation.

In all forms of the through-passage only a relatively small fraction of the total monitored flow passes through the passage.

Figure 4:
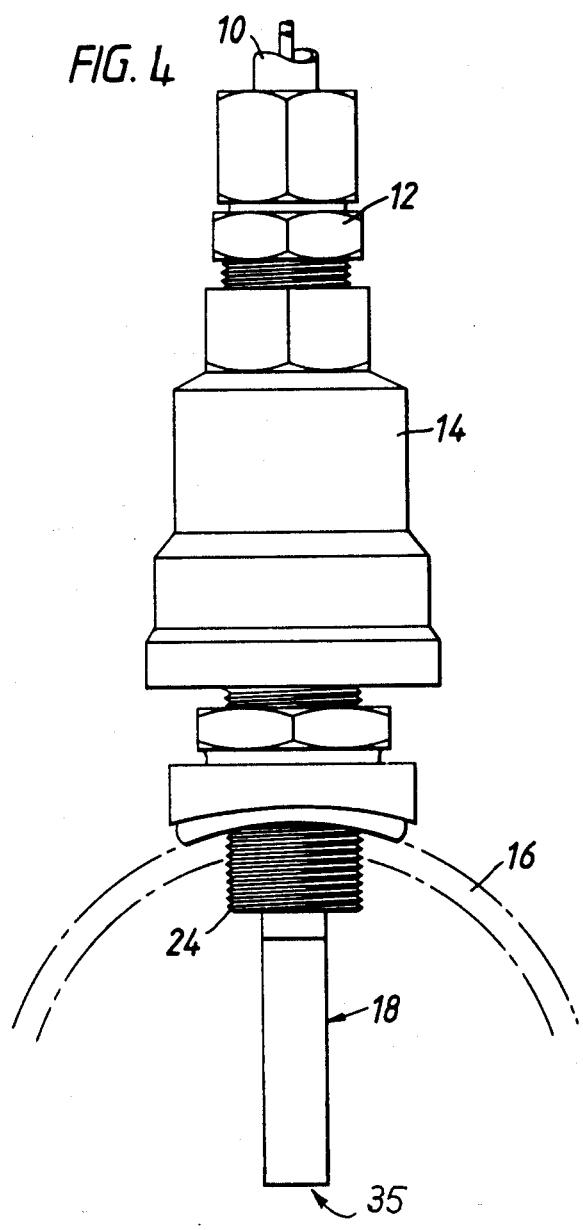

In yet another modification (FIGS. 4 and 5) the tip portion 18 is devoid of any through-passage and the leading edge of the end wall 60 of the portion causes flow-separation from the end wall 60. A sensing port in the wall is positioned at the flow separation and at or adjacent the position of maximum pressure depression caused by the flow-separation. The end wall 60 is either normal to the length of the body so that the port is parallel to the general direction of monitored flow or the wall is inclined to that direction so that the port is inclined and faces downstream in relation to that general direction.

The probe is applicable to monitoring flow of gases other than natural gas and to monitoring flows of liquids and fluid mixtures, including steam, for example.

We claim:

1. Apparatus for monitoring the flow rate of fluid flowing in a conduit, comprising first means for producing a static fluid pressure differential dependent on said flow rate and second means responsive to said pressure differential, said first means defining first and second pressure sensing ports opening into said conduit and including means for connecting said ports to said second means, said first means further comprising an elongate probe withdrawably mounted in said conduit in penetrating relationship thereto, said probe imposing an insignificant reduction in the open internal cross-sectional area of said conduit, said probe defining within said conduit a sharp edge across which fluid flows and downstream thereof a wall past which flows fluid which has crossed said edge, said first pressure sensing port opening at said wall close to said edge, said edge being effective to cause flow-separation of fluid from said wall to produce at said first port a first fluid pressure less than the static pressure of fluid in said conduit, said second port being positioned for sensing a second fluid pressure at least equal to said static pressure, said pressure differential being the difference between said second and first pressures and having a minimum value which is twice the dynamic pressure of the fluid and which is independent of said reduction in area imposed by said probe,
  wherein said probe comprises a tip portion having first and second external surfaces which extend lengthwise of said tip portion and of said probe and which respectively face in the upstream and downstream direction of said fluid in said conduit, said wall extending transversely to both said first and second external surfaces and said wall intersecting said first external surface to form said sharp edge.

2. Apparatus according to claim 1 in which said sharp edge is defined by said wall and by a further wall which faces towards the oncomng flow of fluid in said conduit.

3. Apparatus for monitoring the flow rate of fluid flowing in a conduit, comprising first means for producing a static fluid pressure differential dependent on said flow rate and second means responsive to said pressure differential, said first means defining first and second pressure sensing ports opening into said conduit and including means for connecting said ports to said second means, said first means further comprising an elongate probe withdrawably mounted in said conduit in penetrating relationship thereto, said probe imposing an insignificant reduction in the open internal cross-sectional area of said conduit, said probe defining within said conduit a sharp edge across which fluid flows and downstream thereof a wall past which flows fluid which has crossed said edge, said first pressure sensing port opening at said wall close to said edge, said edge being effective to cause flow-separation of fluid from said wall to produce at said first port a first fluid pressure less than the static pressure of fluid in said conduit, said second port being defined by said probe and positioned for sensing a second fluid pressure at least equal to said static pressure, said pressure differential being the difference between said second and first pressures and having a minimum value which is twice the dynamic pressure of the fluid and which is independent of said reduction in area imposed by said probe,
  wherein said probe has a portion of stepped shape defined by a first face presented towards the oncoming fluid flowing in said conduit and by a second face which is transverse to said first face, said second port opening at said second face adjacent said first face.

4. Apparatus according to claim 3 in which said probe comprises a tip portion defining said sharp edge, said wall, said stepped shape, said first and second faces and said first and second pressure sensing ports, said tip portion defining first and second parallel bores extending lengthwise of said probe and intersecting said wall and said second face, respectively, to form said first and second pressure sensing ports, respectively, said bores being connected by respective passage means which extend lengthwise of said probe out of said conduit and which with said bores form part of said means connecting said ports to said second means.

5. Apparatus for monitoring the flow rate of fluid flowing in a conduit, comprising first means for producing a static fluid pressure differential dependent on said flow rate and second means responsive to said pressure differential, said first means defining first and second pressure sensing ports opening into said conduit and including means for connecting said ports to said second means, said first means further comprising an elongate probe withdrawably mounted in said conduit in penetrating relationship thereto, said probe imposing an insignificant reduction in the open internal cross-sectional area of said conduit, said probe defining within said conduit a sharp edge across which fluid flows and downstream thereof a wall past which flows fluid which has crossed said edge, said first pressure sensing port opening at said wall close to said edge, said edge being effective to cause flow-separation of fluid from said wall to produce at said first port a first fluid pressure less than the static pressure of fluid in said conduit, said second port being positioned for sensing a second fluid pressure at least equal to said static pressure, said pressure differential being the difference between said second and first pressures and having a minimum value which is twice the dynamic pressure of the fluid and which is independent of said reduction in area imposed by said probe, wherein said wall is a boundary wall of a passage extending through said probe in a direction parallel to the lengthwise direction of said conduit, said sharp edge being a circular edge at the upstream end of said passage, said flow-separation causing a vena-contracta in said passage encircled by said boundary wall.

6. Apparatus according to claim 1 wherein said wall is at the very extremity of said tip portion.

* * * * *